Patented Sept. 19, 1950

2,523,243

UNITED STATES PATENT OFFICE 2,523,243

MANUFACTURE OF TETRAETHYL PYROPHOSPHATE

Neal Edmond Willis, St. Louis, Mo., assignor to Monsanto Chemical Company, St. Louis, Mo., a corporation of Delaware No Drawing. Application May 1, 1948, Serial No. 24,672

5 Claims. (Cl. 260—461)

This invention relates to a process for the manufacture, concentration and recovery of tetraethyl pyrophosphate. More particularly, this invention relates to a method of separating and recovering tetraethyl pyrophosphate from the mixtures of reaction products from the processes by which tetraethyl pyrophosphate is made.

Compositions containing tetraethyl pyrophosphate are widely used as agricultural economic poisons, particularly against many insects such as aphids and against many acarina such as the red spider mites, however, such compositions may be used generally against the lower forms of life which, in the past, have been combatted by the use of nicotine or nicotine salts. Furthermore, tetraethyl pyrophosphate has been found useful in the preparation of insectivoricide and rodenticide compositions. In addition, there appear to be many new and advantageous uses of tetraethyl pyrophosphate if substantially pure tetraethyl pyrophosphate were readily available in commercial quantities.

While the art has disclosed several methods for the preparation of tetraethyl pyrophosphate, most of these methods are of interest only from a purely academic and theoretical view point. It has become known to the art that when phosphorus oxychloride is reacted with the neutral triethyl ester of ortho-phosphoric acid in a mol ratio of about 1:3 at temperatures of about 130° C. to 150° C., that the resulting mixtures of reaction products contain about 10–12% of tetraethyl pyrophosphate. Moreover, it is disclosed in U. S. application No. 24,682, filed May 1, 1948, by Harris that the mixtures of reaction products from the reaction of triethyl phosphate and phosphorus oxychloride in the mol ratio of substantially 5:1 at temperatures of 130° C. to 145° C. contain 40% tetraethyl pyrophosphate. However, prior to the present invention there has not been described in the art a practical commercial process for the production and recovery of substantially pure tetraethyl pyrophosphate. Up to this time it has been customary to use the mixtures of reaction products containing the tetraethyl pyrophosphate without any attempt to separate the tetraethyl pyrophosphate from the mixtures of reaction products. There are many instances where it has become highly desirable, even necessary, to have higher concentrations of tetraethyl pyrophosphate than even the 40% concentrations produced by Harris. It is extremely difficult and tedious to separate the tetraethyl pyrophosphate from the mixtures of reaction products, and the most-often tried method, in the laboratory, has been the attempted recovery of tetraethyl pyrophosphate by fractional distillation of the mixtures of reaction products from a process for the synthesis of tetraethyl pyrophosphate. However, such fractional distillations of the reaction mixtures must be carried out under high vacuums of a fraction of a millimeter of mercury, in no case more than 1 millimeter of mercury (absolute), as decomposition of the tetraethyl pyrophosphate apparently takes place at temperatures required for distillation under vacuums wherein the pressure is greater than 1 millimeter of mercury (absolute), and the maintenance of such high vacuums for distillation is extremely expensive and undesirable in a commercial process.

It is an object of this invention to provide a method for the preparation and recovery of substantially pure tetraethyl pyrophosphate, a further object of this invention is to provide a method for the separation, concentration and recovery of the tetraethyl pyrophosphate contained in the mixtures of reaction products from processes for the manufacture of tetraethyl pyrophosphate and which reaction mixtures are relatively dilute with respect to tetraethyl pyrophosphate. A still further object is to provide a process for the manufacture and recovery of substantially pure tetraethyl pyrophosphate which completely avoids the use of very high vacuum distillations in the recovery of tetraethyl pyrophosphate.

In the practice of this invention, the mixture of reaction products containing tetraethyl pyrophosphate is cooled to room temperature and is stirred into water to effect a selective hydrolysis of the higher polyphosphates, i. e. polyphosphates higher than the pyrophosphate. While the hydrolysis may be effectively carried out in water alone, it is preferred to hydrolyze the higher polyphosphates in an aqueous solution at room temperature containing about 9% sodium chloride. The presence of up to 9% sodium chloride aids in the "salting out" of the tetraethyl pyrophosphate and therefore tends toward a more efficient solvent extraction of the tetraethyl pyrophosphate. Aqueous solutions containing more than about 9% sodium chloride are not preferred for use in the hydrolysis step because concentrations greater than 9% of sodium chloride result in an increased extraction, by the solvents, of the diethyl acid phosphate formed as a hydrolysis product. Continuous stirring for about five minutes at room temperature completes a selective hydrolysis of the higher polyphosphates with only a minimal hydrolysis (less than 1%) of the tetraethyl pyrophosphate. This aqueous saline solution of hydrolysis products is contacted with an aliphatic solvent selected from the saturated aliphatic hydrocarbons containing 5 to 12 carbon atoms, and preferably those aliphatic hydrocarbons such as hexane and octane. For convenience, of course, the petroleum fractions containing mixtures of these aliphatic hydrocarbons of the desired chain length may be used. Petroleum fractions which may be mentioned as being suitable for the purposes of this invention are petroleum ether containing predominantly hexanes, gasoline containing hexanes through decanes, naptha containing hexanes and heptanes, ligroin containing heptanes and octanes, benzine containing octanes and nonanes and the kerosene fractions containing predominantly decanes and dodecanes. Of these petroleum fractions, those containing predominantly hexanes to octanes are preferred. Such preferred fractions are petroleum ether, naptha and ligroin.

The solvent layer from the aliphatic solvent extraction contains substantially all of the triethyl phosphate and diethyl acid phosphate contained in the aqueous solution of hydrolysis products. The aliphatic solvent layer and the aqueous layer are separated by decantation. The aliphatic solvent layer may be washed with a dilute sodium carbonate solution to remove the acid diesters and then fractionated to recover the aliphatic solvent which may be used for further extractions and to recover the triethyl phosphate which may be recycled to that portion of the process wherein triethyl phosphate is reacted with phosphorus oxychloride to produce a mixture of reaction products containing tetraethyl pyrophosphate.

The aqueous salt solution of hydrolysis products which has been extracted with the aliphatic solvent is then contacted with a second preferential solvent such as benzene, toluene, monochlorobenzene or carbon tetrachloride to extract the tetraethyl pyrophosphate. Monochlorobenzene is the preferred solvent for this extraction. Chloroform was also tried as the second preferential solvent, however, it is undesirable as chloroform tends to extract the ethyl meta phosphate, the diethyl acid phosphate and the other acidic hydrolysis products. When benzene, toluene, monochlorobenzene or carbon tetrachloride is used, any diethyl ester present tends to remain in the aqueous salt solution together with the acidic hydrolysis products and ethyl meta-phosphate.

The solvent layer from this second preferential solvent extraction contains substantially all of the tetraethyl pyrophosphate which was present in the aqueous solution of hydrolysis products. This solvent extract may be given a wash with dilute $Na_2CO_3$ solution to remove any small amount of diethyl acid phosphate which may have been extracted from the reaction mixture along with the tetraethyl pyrophosphate. After the $Na_2CO_3$ wash, the solvent extract then consists substantially of tetraethyl pyrophosphate and the selected solvent.

As pointed out heretofore, the mixtures of reaction products for the production of tetraethyl pyrophosphate from the reaction of triethyl phosphate and phosphorus oxychloride contain higher polyphosphates in addition to the pyrophosphate ester. When the recovery of tetraethyl pyrophosphate from the mixtures of reaction products is attempted by means of a vacuum fractional distillation of the reaction mixtures, extreme problems of decomposition are often encountered, even when the vacuum is maintained below one millimeter of mercury (absolute). It is believed that the higher polyphosphates are quite susceptible to thermal decomposition, and that these higher polyphosphates do often decompose at the temperatures required for the vacuum distillation of the reaction mixtures to recover the tetraethyl pyrophosphate. Moreover, the decomposition products of the polyphosphates seem to catalyze the decomposition of the tetraethyl pyrophosphate during the vacuum distillation. Decomposition of pure tetraethyl pyrophosphate is believed to begin at temperatures of about 160° C. to 165° C. and therefore a process for the recovery of tetraethyl pyrophosphate which bears as far away from these apparent decomposition temperatures as possible is most desirable.

In the practice of this invention, the above described decomposition problems are substantially eliminated in the separation, concentration and recovery of tetraethyl pyrophosphate from the various reaction mixtures. Moreover, in the practice of this invention the use of very high vacuums (below one millimeter of mercury absolute) during the various fractional distillation steps can be eliminated, for the practice of this invention permits the use of lower temperatures and lower vacuums (of the order of 100–300 millimeters of mercury absolute) in the fractional distillation steps employed in the separation of tetraethyl pyrophosphate and triethyl phosphate from the various reaction mixtures.

In the practice of this invention, the solvent extraction of the aqueous hydrolysis medium permits a separation of the tetraethyl pyrophosphate and the triethyl phosphate substantially free of the higher polyphosphates which, it is believed, have contributed to the decomposition problems encountered in the past during the various distillation steps.

As has been pointed out hereinbefore, the customary method of attempting to separate tetraethyl pyrophosphate from the mixtures of reaction products has been by the use of very high vacuum distillations (less than one millimeter of mercury) in order to effect a vacuum distillation at temperatures as low as possible in order to avoid the problems of decomposition. Such vacuums of less than one millimeter of mercury (absolute) would have to be pulled using a four-stage steam jet ejector with an inter-stage condensation.

Assuming for the moment that one desired to separate a mixture of pure tetraethyl pyrophosphate and triethyl phosphate by fractional distillation, it would be preferred to carry out a vacuum distillation of this mixture at some temperature below 100° C. Therefore to separate a mixture of pure tetraethyl pyrophosphate and triethyl phosphate, it would be necessary to maintain a vacuum of about 10 millimeters of mercury (absolute) in order to bring about a fractional distillation at a temperature very close to 100° C. The 10 millimeters of mercury vacuum required for the fractional distillation of tetraethyl pyrophosphate and triethyl phosphate at 100° C. could be pulled using a three-stage steam jet ejector pump without inter-stage condensation. The initial cost, maintainence and operation of such high vacuum steam ejector pumps is, of course, very expensive and such high vacuums are extremely difficult to hold in commercial operations. However, in the practice of this invention the 100-300 millimeters of mercury (absolute) vacuums which are required for the purpose of low temperature stripping of the solvents from the solvent extractions may be conveniently, easily and economically pulled with a simple water jet ejector, a single-stage steam jet ejector or a mechanical vacuum pump. Moreover, a vacuum of 100-300 millimeters of mercury (absolute) is quite easily maintained even with a system having a number of small leaks.

*Example I*

182.2 g. of triethyl phosphate were placed in a glass reaction vessel equipped with a reflux condenser. The triethyl phosphate was warmed to 130° C., at atmospheric pressure, and 30.7 g. of phosphorus oxychloride (mol ratio 5:1) were gradually added, with stirring, to the warmed triethyl phosphate at such a rate so as to maintain a reaction temperature of about 130° C., which required about two hours. Ethyl chloride is evolved from the reaction mixture upon the addition of phosphorus oxychloride to the triethyl phosphate and the rate of addition of phosphorus oxychloride is more or less governed by the convenience by which the evolved ethyl chloride can be removed from the reaction mixture. After all of the phosphorus oxychloride had been added to the triethyl phosphate and the cessation of bubbling had indicated that the ethyl chloride had ceased being evolved, the reaction mixture was then heated over a period of one hour to about 145° C. and thereafter maintained at 145° C. for an additional two hours. Quantitative chemical analysis of the reaction mixture indicated a 43.6% content of tetraethyl pyrophosphate.

150 g. of the above reaction mixture was stirred into 1500 ml. of an aqueous salt solution at room temperature containing 9% sodium chloride. 1000 ml. of a n-hexane was added and the mixture was vigorously agitated for five minutes. Upon stopping the agitation, the mixture separated into an aqueous phase and a hexane phase and the two phases were separated by decantation. The hexane layer was then washed with an aqueous solution containing 9% sodium chloride and 2% sodium carbonate to remove any of the acid partial esters which may have been extracted with the hexane. The hexane solvent layer was then fractionated, the hexane being stripped off at atmospheric pressure at a temperature of about 69° C. The material remaining in the fractionating column after the stripping of the hexane is substantially pure triethyl phosphate, which may be recycled to that portion of the process wherein phosphorus oxychloride and triethyl phoshate are reacted together to produce a reaction mixture containing tetraethyl pyrophosphate.

Following the extraction of the aqueous mixture of hydrolysis products with hexane, the aqueous mixture was then extracted with one liter of monochlorobenzene. The monochlorobenzene extracts the tetraethyl pyrophosphate from the aqueous mixture of hydrolysis products and also a very small amount of diethyl acid phosphate. The diethyl acid phosphate is removed from the monochlorobenzene and cooled by washing the layer with 250 ml. of an aqueous solution containing 9% sodium chloride and 2% sodium carbonate.

The monochlorobenzene extract was then placed in a fractionating column, and a vacuum of 300 milimeters of mercury (absolute) is placed on the column by means of a water jet ejector pump. Upon slowly heating the mixture in the pot of the fractionating column to 98-101° C. the monochlorobenzene is easily stripped off as a first fraction. The fraction remaining in the pot of the fractionating column will analyze 90-95% tetraethyl pyrophosphate, the remaining 5% being principally triethyl phosphate which was unextracted by the hexane solvent extraction step. By this process 94% of the tetraethyl pyrophosphate which was originally present in the reaction mixture was recovered. At the low temperature required for the stripping of the monochlorobenzene from the tetraethyl pyrophosphate at 300 millimeters of mercury, no decomposition problems were encountered.

*Example II*

546.6 g. of triethyl phosphate were placed in a glass reaction vessel equipped with a reflux condenser. The triethyl phosphate was warmed to 130° C., at atmospheric pressure, and 153.4 g. of phosphorus oxychloride were gradually added, with stirring, to the warmed triethyl phosphate at such a rate so as to maintain a reaction temperature of about 130° C. which required about two hours. After all of the phosphorus oxychloride had been added to the triethyl phosphate, the reaction mixture was then slowly heated to 145° C. over a period of one hour and maintained at 145° C. for an additional hour. Thereafter this reaction mixture was cooled to 130° C. and 364.4 g. of triethyl phosphate were slowly added to the reaction mixture at such a rate so as to maintain a reaction temperature of about 130° C. After all of the triethyl phosphate had been added, the temperature was raised to 145° C. over a period of one hour and thereafter, while the stirring of the reaction mixture was continued, the reaction mixture was held at 145° C. for an additional two hours. Quantitative chemical analysis of the reaction mixture indicated a 41.7% content of tetraethyl pyrophosphate.

This reaction mixture, after cooling to room temperature, was stirred into about 6 liters of a 9% aqueous sodium chloride solution. The stirring was continued for five minutes, at the end of which about 3 liters of petroleum ether were added and the mixture vigorously agitated. Upon stopping the agitation, the mixture separated into two phases, a solvent and an aqueous layer, which layers were separated by decantation. The solvent layer was then washed with an aqueous solution containing 9% sodium chloride and 2% sodium carbonate to remove the acid partial esters which were extracted from the aqueous layer by the petroleum ether. This petroleum ether extract was then distilled in a fractionating column at about 75° C. at atmospheric pressure to strip off the petroleum ether. After stripping off the petroleum ether, the remaining portion was substantially triethyl phosphate which could be recycled to the manufacturing process and be reacted with phosphorus oxychloride to produce a reaction mixture containing tetraethyl pyrophosphate. The aqueous mixture of hydrolysis products was then given a second solvent extraction, the solvent in the second instance being benzene. The benzene extract was placed in a fractionating column and slowly heated to 80-81° C. at atmospheric pressure to strip off the benzene as the first fraction. After the stripping of the benzene, the material remaining in the fractionating column contained 92% tetraethyl pyrophosphate. By this process 93% of the tetraethyl pyrophosphate was recovered. At the low temperature required for the stripping of the benzene from the tetraethyl pyrophosphate, and also for the stripping of the petroleum ether from the triethyl phosphate, no decomposition problems were encountered, and moreover, in Example II, the use of vacuum fractional distillations have been completely eliminated as all of the fractional distillations may be carried out at atmospheric pressure and at temperatures of 100° C. or less.

Having described and set forth my invention in detail and having given examples showing material improvement of my process over the processes of the prior art, I claim:

1. In a process for separating tetraethyl pyrophosphate from a mixture comprising predominantly triethyl phosphate, tetraethyl pyrophosphate and higher polyphosphates, the steps comprising dissolving said mixture containing tetraethyl pyrophosphate in an aqueous substantially 9% sodium chloride solution at substantially 30° C., approximately five minutes thereafter extracting said aqueous solution with an aliphatic solvent selected from the saturated aliphatic hydrocarbons containing at least 6 and not more than 8 carbon atoms, separating said aliphatic solvent layer from the aqueous layer, extracting said aqueous layer from the aliphatic solvent extraction with monochlorobenzene, separating the monochlorobenzene and aqueous layers, washing said monochlorobenzene layer with dilute sodium carbonate, and fractionally distilling said monochlorobenzene layer and recovering the tetraethyl pyrophosphate therefrom.

2. In a process for separating tetraethyl pyrophosphate from a mixture comprising predominantly triethyl phosphate, tetraethyl pyrophosphate and higher polyphosphates, the steps comprising dissolving said mixture containing tetraethyl pyrophosphate in an aqueous substantially 9% sodium chloride solution at substantially 30° C., approximately five minutes thereafter extracting said aqueous hydrolysis solution with an aliphatic solvent selected from the saturated aliphatic hydrocarbons containing at least 6 and not more than 8 carbon atoms, separating said aliphatic solvent layer from the aqueous layer, extracting said aqueous layer from the aliphatic solvent extraction with benzene, separating the benzene and aqueous layers, washing said benzene layer with dilute sodium carbonate, fractionally distilling said benzene layer and recovering the tetraethyl pyrophosphate.

3. In a process for separating tetraethyl pyrophosphate from a mixture composed predominantly of triethyl phosphate, tetraethyl pyrophosphate and higher polyphosphates, the steps comprising preparing an aqueous solution of said mixture containing tetraethyl pyrophosphate at room temperature and permitting the aqueous solution to hydrolyze for a period of time such that not more than about 1% of the tetraethyl pyrophosphate is hydrolyzed, extracting said aqueous solution with an aliphatic solvent selected from the saturated aliphatic hydrocarbons containing at least 5 and not more than 12 carbon atoms, separating the aliphatic solvent layer from the aqueous layer, extracting said aqueous layer from the aliphatic solvent extraction with a second solvent selected from the group consisting of benzene, toluene, monochlorobenzene and carbon tetrachloride, separating the second solvent layer containing tetraethyl pyrophosphate from the aqueous layer, fractionally distilling said second solvent layer containing tetraethyl pyrophosphate and recovering the tetraethyl pyrophosphate.

4. The process comprising dissolving in water at substantially 30° C. a reaction mixture from a process for the preparation of tetraethyl pyrophosphate by the reaction of triethyl phosphate with phosphorus oxychloride to form an aqueous solution, about five minutes thereafter extracting said aqueous solution with an aliphatic solvent selected from the aliphatic hydrocarbons containing at least 6 and not more than 8 carbon atoms, separating the aliphatic solvent layer from the aqueous layer, extracting said aqueous layer from the aliphatic solvent extraction with monochlorobenzene, separating the aqueous layer from the monochlorobenzene layer, fractionally distilling the monochlorobenzene layer and recovering the tetraethyl pyrophosphate.

5. In a process for separating tetraethyl pyrophosphate from a mixture composed predominantly of triethyl phosphate, tetraethyl pyrophosphate and higher polyphosphates, the steps comprising dissolving said mixture in an aqueous sodium chloride solution at substantially 30° C., about five minutes thereafter extracting the aqueous solution with an aliphatic solvent selected from saturated aliphatic hydrocarbons containing at least 5 and not more than 12 carbon atoms, separating said aliphatic solvent layer from the aqueous layer, extracting said aqueous layer from the aliphatic solvent extraction with a second solvent selected from the group consisting of benzene, toluene, monochlorobenzene and carbon tetrachloride, separating the second solvent layer containing tetraethyl pyrophosphate from the aqueous layer, fractionally distilling the solvent layer containing tetraethyl pyrophosphate and recovering the tetraethyl pyrophosphate.

NEAL EDMOND WILLIS.

REFERENCES CITED

The following references are of record in the file of this patent:

UNITED STATES PATENTS

| Number | Name | Date |
| --- | --- | --- |
| 2,402,703 | Woodstock | June 25, 1946 |

OTHER REFERENCES

Clermont, "Annalen der Chemie," vol. 91 (1854), pages 375–6.

Cavalier, "Comptes Rendus," vol. 142 (1906), pages 885–7.

Rosenhein et al., "Ber. Deut. Chem. Ges.," vol. 41 (1908), 2708–11.

Balarew, "Zeit. Anorg. Allgem. Chemie," vol. 99 (1917), page 191.